United States Patent [19]

Lee

[11] 4,326,415

[45] Apr. 27, 1982

[54] SPEED INDICATING APPARATUS FOR VEHICLES

[76] Inventor: Jiunn-Feng Lee, 4th Fl., 103, Sec. 2, Wu-Chang St., Taipei, Taiwan

[21] Appl. No.: 134,662

[22] Filed: Mar. 27, 1980

Related U.S. Application Data

[63] Continuation-in-part of Ser. No. 42,120, May 24, 1979, Pat. No. 4,227,416.

[30] Foreign Application Priority Data

Jan. 5, 1978 [TW] Taiwan .................................. 6720026
Aug. 20, 1979 [TW] Taiwan .................................. 6823004

[51] Int. Cl.³ ........................... G01P 3/36; G01P 3/50
[52] U.S. Cl. ................................. 73/499; 250/231 SE
[58] Field of Search .................... 73/499; 250/231 SE; 340/347 P

[56] References Cited

U.S. PATENT DOCUMENTS

| | | | |
|---|---|---|---|
| 1,491,347 | 4/1924 | Goldman | 73/499 |
| 2,579,806 | 12/1951 | Dvorkin | 73/499 |
| 3,670,325 | 6/1972 | Mathevosian | 340/347 P |
| 4,041,782 | 8/1977 | Hingst | 73/499 |
| 4,227,416 | 10/1980 | Lee | 73/499 |

FOREIGN PATENT DOCUMENTS 572661 3/1959 Canada ................................. 73/499

*Primary Examiner*—Kyle L. Howell
*Assistant Examiner*—Denis E. Corr

[57] ABSTRACT

This invention relates to a speed indicating apparatus for a vehicle comprising a plurality of indicator lights and a speed counter, each said indicator lights mounted externally on the rear frame of the vehicle being connected to said speed counter by means of electric wires respectively and said speed counter being connected with a speedometer of the vehicle by means of a soft steel shaft which is in turn connected with gears of a speed change gear of the vehicle so as to transmit the rotating speed thereof to said speedometer and speed counter.

4 Claims, 4 Drawing Figures

SPEED INDICATING APPARATUS FOR VEHICLES

RELATED APPLICATIONS

This is a continuation in part of my application Ser. No. 042,120 filed on May 24, 1979 and issued on Oct. 14, 1980 as U.S. Pat. No. 4,227,416 having the above title.

CROSS REFERENCES

U.S. Pat. Nos. 2,992,300, 3,258,554, 2,814,796, 4,137,512, 2,887,679, 4,041,782, Canada Pat. No. 572,661.

FIELD OF THE INVENTION

This invention discloses a speed indicating apparatus for a vehicle in which the travelling speed of the vehicle may be read by other drivers at all times from the veriation of the colours and figures of the indicator lights thereof so as to minimize traffic accidents. Furthermore, two warning lamps mounted on both sides of the indicator lights will glow and the alarming device thereof will ring whenever the travelling speed exceeds a certain degree so as to warn both the driver thereof and other drivers.

For many years vehicles have extensively provided people with useful and convenient transportation but there is no denying that many people have been killed in traffic accidents though much emphasis has been placed on safety in vehicles. The conventional speedometer is situated within an automobile, thus the travelling speed is known to the driver only. Accordingly, it would be desired to provide a speed indicating apparatus for an automobile to give indication of the travelling speed at all times so that other drivers may determine the exact speed at thich the automobile is maintaining.

SUMMARY OF THE INVENTION

It is therefore an important object of the present invention to provide a speed indicating apparatus for vehicles which comprises a set of indicator lights and a speed counter. Such indicator lights mounted externally on the rear frame of the vehicle are given with figures or colours so as to show the speed of the vehicle by means of the colours or figures thereof. It is noted that the number of the indicator lights which are lit depends on the travelling speed.

A further object of this invention is to provide two warning lamps on both sides of the indicator lights which will glow whenever the speed of the vehicle reaches a certain rate so that both the driver thereof and other drivers may be warned of the danger.

A still further object of this invention is to provide in a vehicle an alarming device for sending out warning sound when the speed thereof exceeds a certain rate.

Another still further object of this invention is to provide a speed counter for transmitting the rotating speed of the transmission case thereof to the indicator lights.

These together with other advantages and objects of this invention will become more apparent in the following detailed description with reference to the accompanying drawings, and in which.

DETAILED DESCRIPTION OF THE PREFERRED EMBODIMENT

Figure 1:
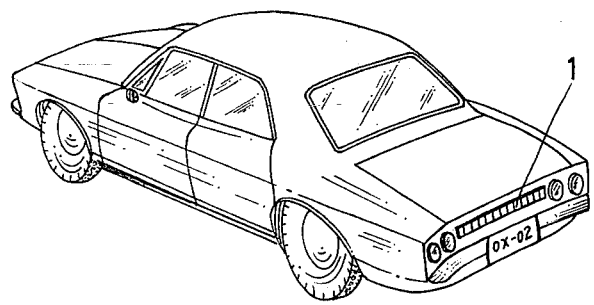
FIG. 1 is a perspective view of a conventional automobile on the outer rear frame thereof the indicator lights are mounted.
Figure 2:
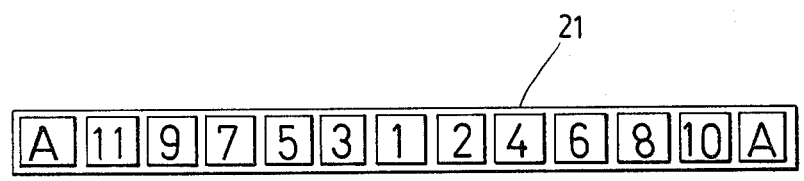
FIG. 2 is an enlarged front view of the indicator lights as illustrated in FIG. 1.

FIG. 1 shows the manner in which an indicator lights set 1 of this invention is applied to, mounted externally on the rear frame of a vehicle. Referring to FIG. 2, the indicator lights set 1 as shown comprises a plurality of indicator lights 21 to give indication of the travelling speed of the vehicle at all times by means of the figures, colours or the combination of both of them each of the indicator lights 21 may, for instance, be given on its outer surface a figure and/or a colour to indicate the speed by ten miles or twenty miles an hour. The indicator lights 21 will be lit or extinguished one by one as the travelling speed increases or decreases so that other drivers may be made known of the variations of the travelling speed of the vehicle. Two warning lamps "A" positioned on both sides of the indicator lights 21 will glow only when the travelling speed thereof exceeds a certain degree, furthermore, an alarming device (not shown) provided thereof will ring simultaneously so as to warn both the driver thereof and other drivers.

Figure 3:
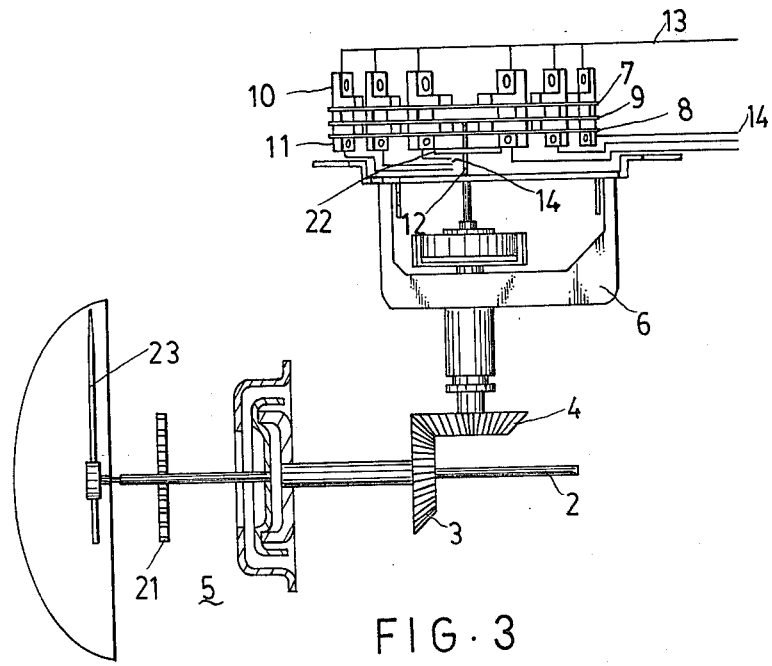
FIG. 3 is a plan view illustrating the manner in which the speed counter of this invention is applied in use with the conventional speedometer.

FIG. 3 is a plan view showing how a speed indicating apparatus of this invention is operated in conjunction with the conventional speedometer 5 of the vehicle, wherein a soft steel shaft 2 serving to transmit the rotating speed of a transmission case to a first umbrella-shaped gear 3 which is in turn connected to the conventional speedometer 5. The umbrella-shaped gear 3 further engages with a second umbrella-shaped gear 4 which follows the first umbrella-shaped gear 3 to rotate at the same speed. Connected with the shaft center of the second umbrella-shaped gear 4 is a speed counter 6 similar to the speedometer 5 in construction but the pointer and dial of the latter are omitted therefrom and two disks 7, 8 of similar size mounted on a shaft 12 are instead situated in parallel on where the dial should have been, the upper disk 7 thereof having a plurality of photoelectric sensors 10 arranged regularly on half of its rim area whilst a plurality of light sources 11 corresponding to said photoelectric sensors 10 in both number and position being provided on the lower disk 8. A semi-circular plate 9 having a diameter equal to that of said two disks 7, 8 is situated therebetween with its shaft center connected to the shaft center of the speed counter 6 by the shaft 12.

The semi-circular plate 9 rotates between said two disks 7, 8 as a result of the attraction of magetic field of the speedometer 5 and obstructs with its rim the photoelectric absorption between said photoelectric sensors 10 and light sources 11 now and then. Said semi-circular plate 9 rotates to obstruct more photoelectric absorption between said photoelectric tubes and sensors as the travelling speed increases so as to light up the indicator lights 21. Whenever the travelling speed exceeds a certain rate, the semi-circular plate 9 will obstruct the photoelectric absorption between the last pair of photoelectric tube and sensor, the two warning lamps "A" will glow and the alarming device will ring to warn both the driver thereof and other drivers. Whenever the speed of the vehicle reduces by degree to zero, a pointer 23 of the speedometer 5 will be driven to its initial position by a spring 21 thereof; said semi-circular plate 9 will, in a similar manner, be driven by a spring 22 to its initial position. Said photoelectric tubes 10 are connected with the electric sourse (not shown) by means of an electric wire 13, thus once the vehicle starts, the wire 13 is energized to cause said photoelectric tubes 10 to glow. A plurality of electric wires 14 are connected to said sensors 10 respectively to transmit the photoelectric signals received by said sensors 10 to set of electronic switches (not shown) which will in turn lighten the indicator lights 21 according to the speed of the vehicle as indicated by the speedometer 5. As the electric sourse and electronic switches are well-known skills and not part of this invention, they will be not described hereinafter.

Figure 4:
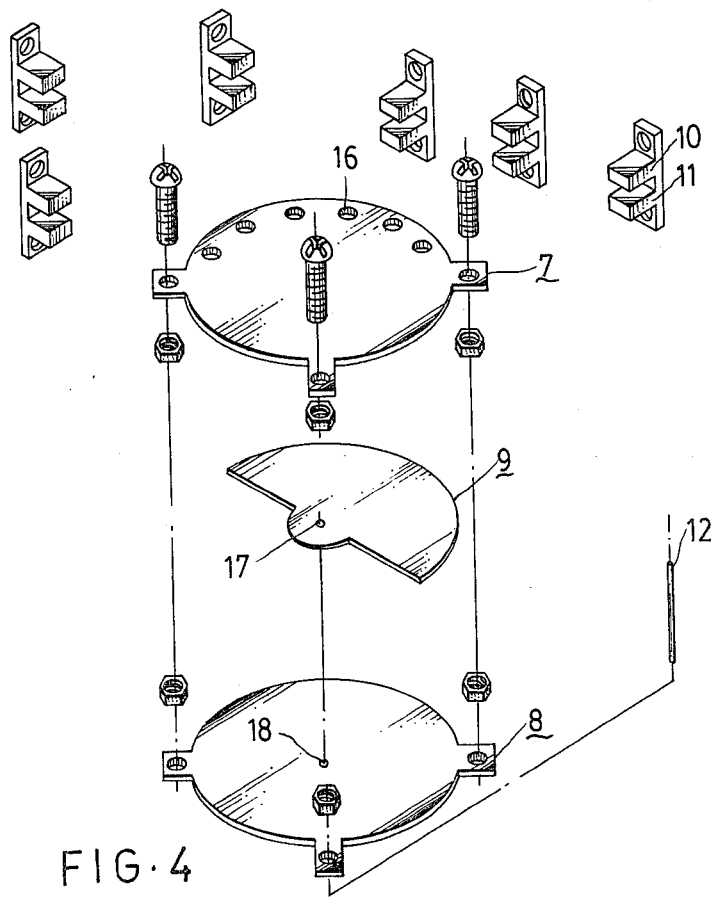
FIG. 4 is an explosive view of the speed counter of FIG. 3.

Referring now to FIG. 4 in particular, a plurality of holes 16 disposed in spaced relation are provided on said half rim area of said upper disk 7 so that the photoelectric signals of said photoelectric sensors 10 may be transmitted from said sensors 10 on said lower disk 8. Said semi-circular plate 9 located between said two disks 7, 8 is connected on its shaft center 17 to that of the speed counter 6 by means of the shaft 12 extending through a shaft center 18 of said lower disk 8. As mentioned above, the speed counter 6 is similar to the speedometer in construction, said semi-circular plate 9 acting as a pointer will follow swinging of the pointer 23 to rotate at the same rate, thus, the indicator lights 21 mounted on the rear of the vehicle can give indication of the exact speed of the working vehicle.

The foregoing merely discloses a specific embodiment of the principle of this invention, it will be understood that various modifications within the spirit of the invention may occur to those skilled in this art. It is therefore intended that so limitation be placed on the invention as defined by the appended claims.

What is claimed is:

1. A speed indicating apparatus for a vehicle, comprising:
   a speed counter coupled to the speedometer cable of the vehicle; and
   a plurality of indicator lights mounted externally on the rear frame of the vehicle and controlled by said speed counter,
   said speed counter including;
   a frame including two spaced discs, one of said discs having a plurality of holes therethrough spaced along one-half of the periphery thereof;
   a corresponding plurality of light sources arranged to project light through respective ones of said holes;
   a corresponding plurality of photoelectric sensors on the opposite side of said one disc from said light sources and arranged to receive light from respective ones of said light sources through said holes;
   a semicircular plate of equal size to said discs, said plate being concentrically rotatably mounted between said discs such that said plate selectively blocks the paths of light between respective ones of said light sources and said photoelectric sensors as said plate is rotated with respect to said discs; and
   magnetic coupling means connected to said plate and the speedometer cable for rotating said plate an amount corresponding to the speed of the vehicle.
   whereby, as the speed of the vehicle increases, said plate is rotated to block an increasing number of light paths to said sensors and to thereby light up an increasing number of said indicator lights.

2. A speed indicating apparatus according to claim 1, wherein said indicator lights further comprises two warning lamps on both sides thereof to glow whenever the travelling speed thereof reaches a certain rate.

3. A speed indicating apparatus according to claim 1, wherein said speed counter is connected with a soft steel shaft of a conventional speedometer of the vehicle by means of two umbrella-shaped gears therebetween so that two gears may rotate at the same pace to transmit the speed signal to said indicator lights.

4. A speed indicating apparatus according to claim 2, further comprising an alarm connected to sound when said warning lamps glow, and wherein said warning lamps are caused to glow when said plate rotates to block the light path to the last one of said photoelectric sensors.

* * * * *